United States Patent
Huang et al.

(10) Patent No.: US 9,582,436 B2
(45) Date of Patent: *Feb. 28, 2017

(54) APPARATUS AND METHOD FOR COPYING RULES BETWEEN DEVICES

(71) Applicant: Nokia Technologies Oy, Espoo (FI)

(72) Inventors: Mingjing Huang, San Francisco, CA (US); Tsaifa Yao, Santa Clara, CA (US); Vijo Cherian, San Jose, CA (US); Praveen Krishnan, Sunnyvale, CA (US)

(73) Assignee: Nokia Technologies Oy, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 14/928,720

(22) Filed: Oct. 30, 2015

(65) Prior Publication Data

US 2016/0055104 A1 Feb. 25, 2016

Related U.S. Application Data

(63) Continuation of application No. 14/066,662, filed on Oct. 29, 2013, now Pat. No. 9,195,616.

(51) Int. Cl.
*G06F 13/10* (2006.01)
*H04M 1/725* (2006.01)
(Continued)

(52) U.S. Cl.
CPC .......... *G06F 13/107* (2013.01); *G06F 9/4411* (2013.01); *G06F 13/10* (2013.01);
(Continued)

(58) Field of Classification Search
CPC .................. G06F 3/00; G06F 13/00
(Continued)

(56) References Cited

U.S. PATENT DOCUMENTS 7,610,055 B2 10/2009 Erhart et al.
8,209,436 B2 6/2012 Esteve Asensio et al.
(Continued)

FOREIGN PATENT DOCUMENTS

EP 2 455 859 A1 5/2012
GB 2 350 749 A 12/2000
(Continued)

OTHER PUBLICATIONS

International Search Report and Written Opinion from corresponding International Application No. PCT/FI2014/050808, dated Feb. 13, 2015.
(Continued)

*Primary Examiner* — Christopher Shin
(74) *Attorney, Agent, or Firm* — Alston & Bird LLP

(57) ABSTRACT

Devices, systems, and methods are described for allowing rules that are applied to one device to be applied to another device based on a user's interaction with only the devices. A rule-copy action, such as simultaneous shaking of the two devices, proximity of the two devices to each other, and/or the relative positions of the two devices, may be detected at one of the devices (e.g., a first device to which the user desires the rules or a copy of the rules to apply). In response to the rule-copy action, another device (e.g., a second device configured to operate according to the at least one rule) may be identified. The at least one rule may then be caused to be applied to the first device in response to detection of the rule-copy action, so as to configure the first device to operate according to the at least one rule.

20 Claims, 6 Drawing Sheets

(51) Int. Cl.
*H04L 29/08* (2006.01)
*H04L 12/24* (2006.01)
*G06F 9/44* (2006.01)
G06F 3/00 (2006.01)
G06F 3/01 (2006.01)
H04W 4/00 (2009.01)

(52) U.S. Cl.
CPC .......... *H04L 41/00* (2013.01); *H04L 41/0846* (2013.01); *H04L 67/1095* (2013.01); *H04L 67/34* (2013.01); *H04M 1/7253* (2013.01); *H04W 4/001* (2013.01); *G06F 3/017* (2013.01); *H04M 1/72563* (2013.01); *H04W 4/005* (2013.01); *H04W 4/008* (2013.01)

(58) Field of Classification Search
USPC ........................ 710/8; 715/748–749; 713/168
See application file for complete search history.

(56) References Cited

U.S. PATENT DOCUMENTS

| | | |
|---|---|---|
| 8,762,715 B2 | 6/2014 | Camp, Jr. et al. |
| 2006/0120518 A1 | 6/2006 | Baudino et al. |
| 2009/0302998 A1 | 12/2009 | Trappeniers et al. |
| 2010/0167646 A1 | 7/2010 | Alameh et al. |
| 2011/0126009 A1 | 5/2011 | Camp, Jr. et al. |
| 2011/0126014 A1 | 5/2011 | Camp, Jr. et al. |
| 2012/0151415 A1 | 6/2012 | Park et al. |
| 2012/0214416 A1* | 8/2012 | Kent ....................... H04L 63/18 455/41.2 |
| 2012/0278727 A1 | 11/2012 | Ananthakrishnan et al. |
| 2013/0212233 A1 | 8/2013 | Landry |
| 2013/0339535 A1* | 12/2013 | Burckart ........... G06F 17/30899 709/229 |

FOREIGN PATENT DOCUMENTS

| | | |
|---|---|---|
| WO | WO 2007/102110 A1 | 9/2007 |
| WO | WO 2009/136194 A2 | 11/2009 |

OTHER PUBLICATIONS

Office Action from U.S. Appl. No. 14/066,662, dated Jan. 30, 2015.
Notice of Allowance from U.S. Appl. No. 14/066,662, dated Jul. 23, 2015.

\* cited by examiner

APPARATUS AND METHOD FOR COPYING RULES BETWEEN DEVICES

CROSS-REFERENCE TO RELATED APPLICATIONS

This application claims the benefit of U.S. application Ser. No. 14/066,662 entitled "Apparatus and Method for Copying Rules Between Devices," filed Oct. 29, 2013, the contents of which are incorporated herein in their entirety.

TECHNOLOGICAL FIELD

Example embodiments of the present invention relate generally to providing rules stored on one device to another device.

BACKGROUND

Devices exist for facilitating various user activities and, as such, come in many different sizes and shapes and have varying degrees of functionality. Some devices, such as sensors and other small form factor devices, for example, may not have an extensive user interface element. For example, in some cases, a sensor may only be equipped with a single button or a light emitting diode (LED) that function as the user interface element.

At the same time, a user may require several such devices to operate in the same manner in order to accomplish a particular task. Each device may thus be required to operate according to the same rules.

BRIEF SUMMARY OF EXAMPLE EMBODIMENTS

Accordingly, embodiments of an apparatus, method, and computer program product are described that can provide for rules that are applicable to one device, such as a sensor, to be applied to another device, such as another sensor, solely as a result of user interaction with those devices. In particular, embodiments of an apparatus for duplicating rules between devices may include at least one processor and at least one memory including computer program code. The at least one memory and the computer program code may be configured to, with the processor, cause the apparatus to at least detect a rule-copy action at a first device; identify a second device in response to the rule-copy action, wherein the second device is configured to operate according to at least one rule; and cause the at least one rule to be applied to the first device in response to detection of the rule-copy action, so as to configure the first device to operate according to the at least one rule.

In some cases, the at least one memory and the computer program code may be configured to, with the processor, cause the apparatus to detect the rule-copy action by detecting a motion imparted on the first device and on the second device at substantially the same time. The at least one memory and the computer program code may be configured to, with the processor, cause the apparatus to detect the rule-copy action by detecting a proximity of the first device to the second device and/or by detecting a position of the first device with respect to the second device. In some embodiments, the at least one memory and the computer program code may be configured to, with the processor, cause the apparatus to identify the second device based on participation of the second device in the rule-copy action.

The at least one memory and the computer program code may be configured to, with the processor, cause the apparatus to cause the at least one rule to be applied to the first device via communication with the second device. Additionally or alternatively, the at least one memory and the computer program code may be configured to, with the processor, cause the apparatus to cause the at least one rule to be applied to the first device via communication with a server and/or via communication with the first device.

In other embodiments, a method and a computer program product are described for detecting a rule-copy action at a first device; identifying a second device in response to the rule-copy action, wherein the second device is configured to operate according to at least one rule; and causing the at least one rule to be applied to the first device in response to detection of the rule-copy action, so as to configure the first device to operate according to the at least one rule. The method and computer program code may be configured for detecting at least one of (a) a motion imparted on the first device and on the second device at substantially the same time; or (b) a proximity of the first device to the second device.

In some cases, a position of the first device with respect to the second device may be detected. The second device may be identified based on participation of the second device in the rule-copy action. The method and computer program code may be configured for causing the at least one rule to be applied to the first device by communicating with the second device and/or by communicating with a server. Additionally or alternatively, the at least one rule to be applied to the first device by communicating with the first device.

In still other embodiments, an apparatus is described for providing for rules that are applicable to one device to be applied to another device solely as a result of user interaction with those devices. The apparatus may include means for detecting a rule-copy action at a first device; means for identifying, via the processor, a second device in response to the rule-copy action, wherein the second device is configured to operate according to at least one rule; land means for causing the at least one rule to be applied to the first device in response to detection of the rule-copy action, so as to configure the first device to operate according to the at least one rule.

BRIEF DESCRIPTION OF THE SEVERAL VIEWS OF THE DRAWING(S)

Having thus described certain example embodiments of the invention in general terms, reference will now be made to the accompanying drawings, which are not necessarily drawn to scale, and wherein:

DETAILED DESCRIPTION

Figure 1:
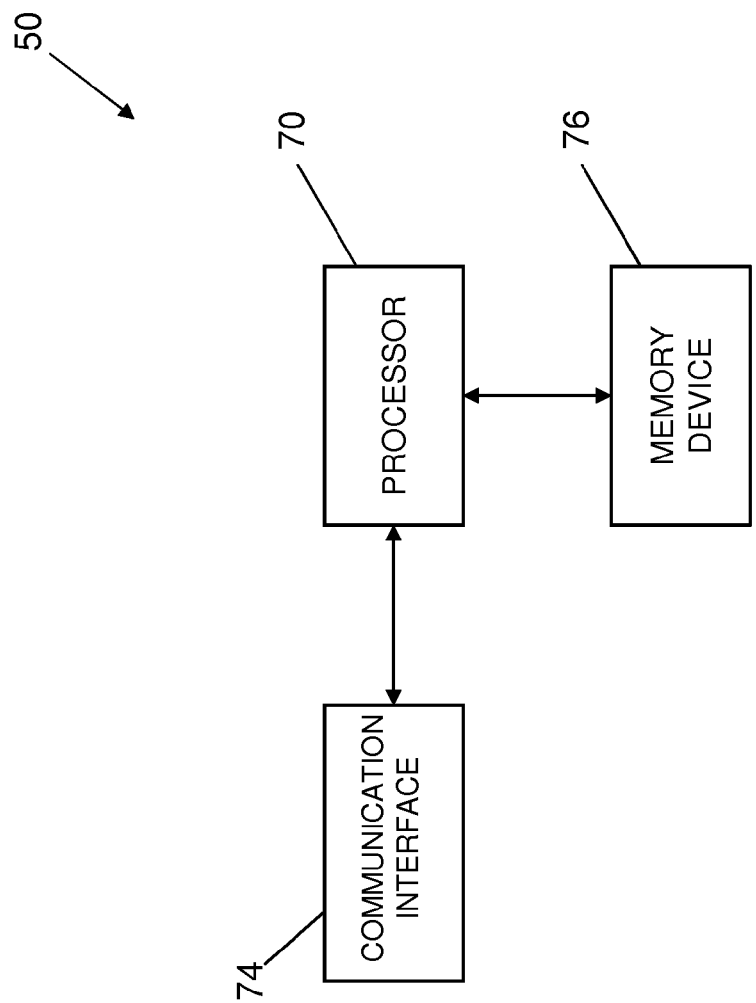
FIG. 1 illustrates one example of an apparatus for applying rules for one device to another device according to an example embodiment of the present invention.

Some example embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a physical storage medium (e.g., volatile or non-volatile memory device), can be differentiated from a "computer-readable transmission medium," which refers to an electromagnetic signal.

As noted above, small form factor devices, such as temperature sensors and other types of sensors, may have limited user interface features. The user interface on a temperature sensor, for example, may consist of a single button and/or an LED. These small form factor devices may be configured to operate in accordance with specific rules. For example, the temperature sensor device described above may be programmed to send a signal to a server over a network, such as the Internet, when the temperature being monitored rises above 80° F.

In some cases, a user may require multiple sensors to operate according to the same set of rules. Continuing the temperature sensor example, the user may be monitoring the temperature of a large object in multiple locations using temperature sensors. In this example, each sensor must operate according to the same rules, such as to send a signal to a server over the Internet when the monitored temperature rises above 80° F. (as an example). In addition, the user may need to add or remove sensors from the network of sensors at different times.

Because small form factor devices such as the sensors of the described example may have limited user interfaces, it may be difficult for a user to interact with a device on an individual basis to set up rules to control the device's behavior. The user may thus have to resort to interacting with web, mobile, or other computing interface to control the set of rules applied to each device. Such a scenario may, however, increase the individual setup time required to configure the devices and can be overly burdensome and, in some cases, simply unfeasible, and may in the very least cause the user to experience great frustration.

Accordingly, embodiments of the present invention allow a user to duplicate rules of one device and apply the rules to another device through user interaction with the devices alone (e.g., without requiring the user to interact with the Internet, a server, or another other third-party device or user interface platform). In this regard, and as described in greater detail below, the user may interact with one or two devices (e.g., the device that holds the stored rules and the device to which the rules are to be applied) to provide a rule-copy action. Upon the detection of the rule-copy action, either by one of the devices or by a third device (e.g., a server) in communication with both devices, the rules of one device may be applied to the other device such that both devices operate according to the same rule set. Such rule-copy actions may be, for example, motion-based (e.g., shaking both devices together in one hand), position-based (e.g., stacking the devices together and activating the rule copy function), or proximity-based (e.g., allowing a device that does not have rules to request rules from a similar device that is either in contact with the requesting device or nearby). In this way, the user may have an intuitive and simple way to interact with small form factor devices to make rules applicable to one device also applicable to another.

An example embodiment of the invention will now be described with reference to FIG. 1, which depicts certain elements of an apparatus 50 for duplicating rules and applying the rules to more than one device. The apparatus 50 of FIG. 1 may be employed, for example, with the first device 100 of FIG. 2. However, it should be noted that the apparatus 50 of FIG. 1 may also be employed in connection with a variety of other devices, both mobile and fixed, such as the server 110 of FIG. 2 described below, and therefore embodiments of the present invention should not be limited to application on devices such as the first device 100 of FIGS. 2 and 3. For example, the apparatus 50 may be employed on other devices such as personal computers, tablets, mobile telephones, mobile computing devices, or other user terminals. Moreover, in some cases, part or all of the apparatus 50 may be on a fixed device such as a server (e.g., the server 110 of FIG. 2) or other service platform and the content may be presented (e.g., via a server/client relationship) on a remote device such as a user terminal (e.g., a mobile terminal) based on processing that occurs at the fixed device.

It should also be noted that while FIG. 1 illustrates one example of a configuration of an apparatus for providing duplication of rules between multiple devices, numerous other configurations may also be used to implement embodiments of the present invention. As such, in some embodiments, although devices or elements are shown as being in communication with each other, hereinafter such devices or elements should be considered to be capable of being embodied within a same device or element and, thus, devices or elements shown in communication should be understood to alternatively be portions of the same device or element.

Referring to FIG. 1, the apparatus 50 for providing duplication of rules between multiple devices may include or otherwise be in communication with a processor 70, a communication interface 74, and a memory device 76. In some embodiments, the processor 70 (and/or co-processors or any other processing circuitry assisting or otherwise associated with the processor 70) may be in communication with the memory device 76 via a bus for passing information among components of the apparatus 50. The memory device 76 may include, for example, one or more volatile and/or non-volatile memories. In other words, for example, the memory device 76 may be an electronic storage device (e.g., a computer readable storage medium) comprising gates configured to store data (e.g., bits) that may be retrievable by a machine (e.g., a computing device like the processor 70). The memory device 76 may be configured to store information, data, content, applications, instructions, rules, or the like for enabling the apparatus to carry out various functions in accordance with an example embodiment of the present invention. For example, the memory device 76 could be configured to store rules for execution by the processor 70 or for directing another device, as described in greater detail below.

The apparatus 50 may, in some embodiments, be a small form factor device, such as a sensor, a mobile terminal, or a fixed communication device or computing device (e.g., a server) configured to employ an example embodiment of the present invention. However, in some embodiments, the apparatus 50 may be embodied as a chip or chip set. In other words, the apparatus 50 may comprise one or more physical packages (e.g., chips) including materials, components and/ or wires on a structural assembly (e.g., a baseboard). The structural assembly may provide physical strength, conservation of size, and/or limitation of electrical interaction for component circuitry included thereon. The apparatus 50 may therefore, in some cases, be configured to implement an embodiment of the present invention on a single chip or as a single "system on a chip." As such, in some cases, a chip or chipset may constitute means for performing one or more operations for providing the functionalities described herein.

The processor 70 may be embodied in a number of different ways. For example, the processor 70 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 70 may include one or more processing cores configured to perform independently. A multi-core processor may enable multiprocessing within a single physical package. Additionally or alternatively, the processor 70 may include one or more processors configured in tandem via the bus to enable independent execution of instructions, pipelining and/or multithreading.

In an example embodiment, the processor 70 may be configured to execute instructions stored in the memory device 76 or otherwise accessible to the processor 70. Alternatively or additionally, the processor 70 may be configured to execute hard coded functionality. As such, whether configured by hardware or software methods, or by a combination thereof, the processor 70 may represent an entity (e.g., physically embodied in circuitry) capable of performing operations according to an embodiment of the present invention while configured accordingly. Thus, for example, when the processor 70 is embodied as an ASIC, FPGA or the like, the processor 70 may be specifically configured hardware for conducting the operations described herein. Alternatively, as another example, when the processor 70 is embodied as an executor of software instructions, the instructions may specifically configure the processor 70 to perform the algorithms and/or operations described herein when the instructions are executed. However, in some cases, the processor 70 may be a processor of a specific device (e.g., a mobile terminal or network device) adapted for employing an embodiment of the present invention by further configuration of the processor 70 by instructions for performing the algorithms and/or operations described herein. The processor 70 may include, among other things, a clock, an arithmetic logic unit (ALU) and logic gates configured to support operation of the processor 70.

Meanwhile, the communication interface 74 may be any means such as a device or circuitry embodied in either hardware or a combination of hardware and software that is configured to receive and/or transmit data from/to a network and/or any other device or module in communication with the apparatus 50. In this regard, the communication interface 74 may include, for example, an antenna (or multiple antennas) and supporting hardware and/or software for enabling communications with a wireless communication network. Additionally or alternatively, the communication interface 74 may include the circuitry for interacting with the antenna(s) to cause transmission of signals via the antenna(s) or to handle receipt of signals received via the antenna(s). In some environments, the communication interface 74 may alternatively or also support wired communication. As such, for example, the communication interface 74 may include a communication modem and/or other hardware/software for supporting communication via cable, digital subscriber line (DSL), universal serial bus (USB) or other mechanisms.

Figure 2:
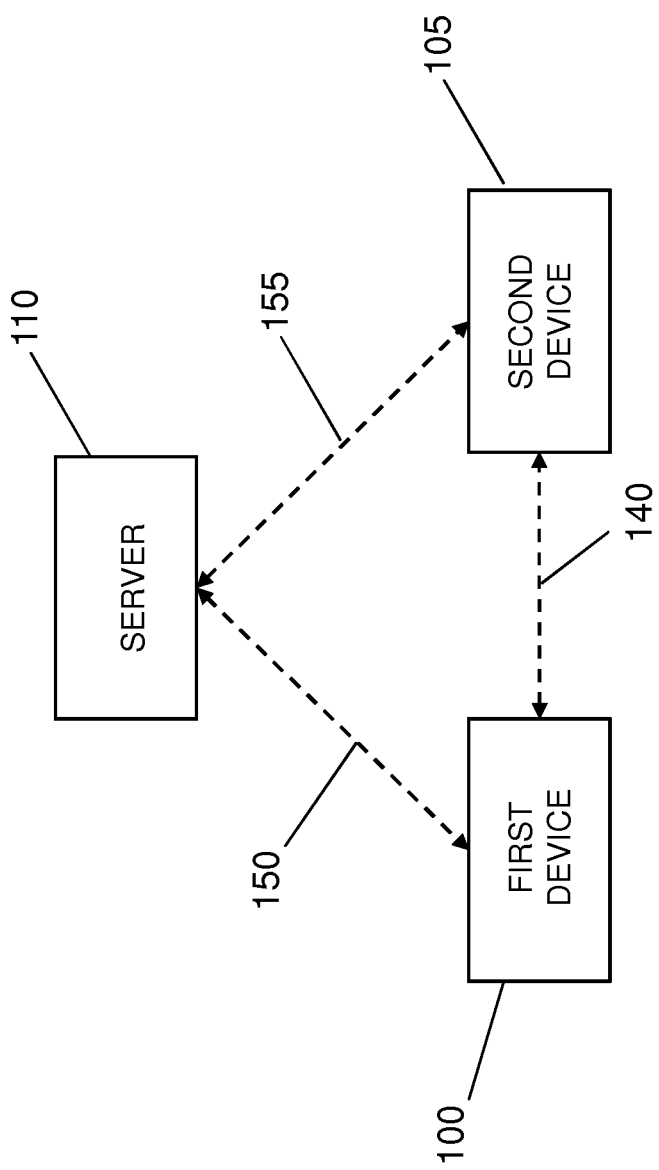
FIG. 2 illustrates a system for applying rules for one device to another device according to an example embodiment of the present invention.

Referring now to FIG. 2, a system is shown that includes a first device 100, a second device 105, and a server 110. The first device 100 may be, for example a small form factor device such as a sensor (e.g., a temperature sensor, a humidity sensor, a light sensor, etc.). The second device 105 may likewise be another small form factor device, such as another sensor. The first and second devices 100, 105 may be configured to operate according to certain rules. The server 110 may be in communication with each of the sensors 100, 105, such as over a network (e.g., the Internet).

In some embodiments, the server 110 may be configured to manage the rules according to which the first and second devices 100, 105 are to operate. The rules may be, for example, a set of one or more instructions directing each respective device 100, 105 to measure a particular variable (e.g., temperature, humidity, pressure, light intensity, etc.) and to transmit a signal (e.g., to the server 110 or to a different device) when a particular condition is met. For example, devices 100, 105 that are temperature sensors may, according to the rules applied to those devices, be configured to detect the temperature of a fluid and to transmit a signal (e.g., to the server 110) when the temperature exceeds a particular threshold (e.g., when the temperature is greater than 80° F.), is outside a particular window of values (e.g., is less than 50° F. or is greater than 72° F.), etc.

In this regard, each of the first and second devices 100, 105 may be assigned a unique identifier (e.g., by the server 110). The server 110 may, in some cases, be configured to monitor the status of the devices (e.g., to provide the user with information regarding which devices are functioning, the current value of the variable measured by each device, and/or the location of the device, etc.).

Figure 3:
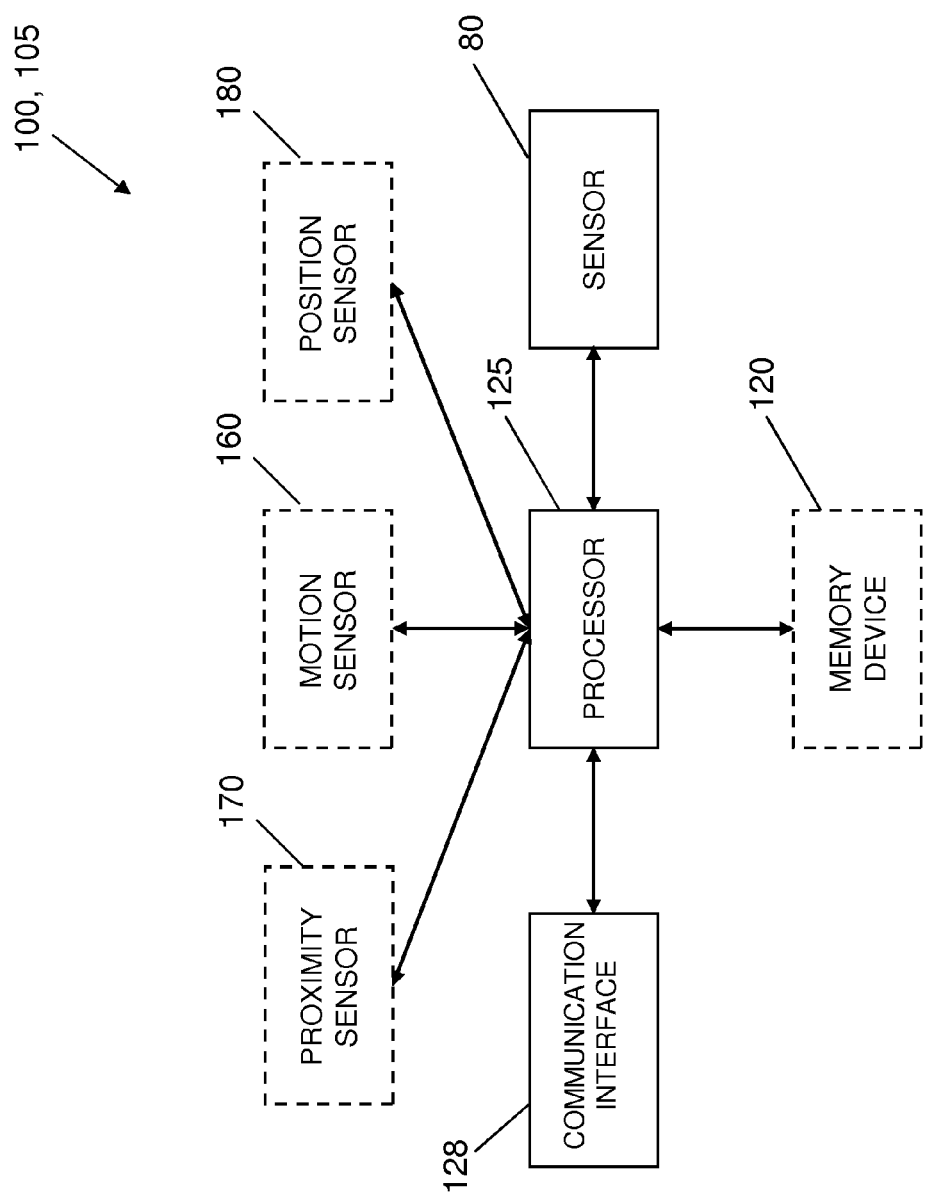
FIG. 3 illustrates a schematic block diagram of a first device and/or a second device according to an example embodiment of the present invention.

With reference to FIG. 3, in some embodiments, each of the first and second devices 100, 105 may include a memory 120, such as the memory 76 of FIG. 1. Accordingly, in some cases, the rules to be applied by the first and second devices may be stored on the memory 120 of the particular device 100, 105. In such cases, the server 110 may capable of configuring the devices 100, 105 by storing one or more rules in the memory 120 of the particular device to be configured (e.g., in response to input from a user interacting with the server to program the respective device), such that each device may operate by referring to the rules stored in its own memory.

Figure 4:
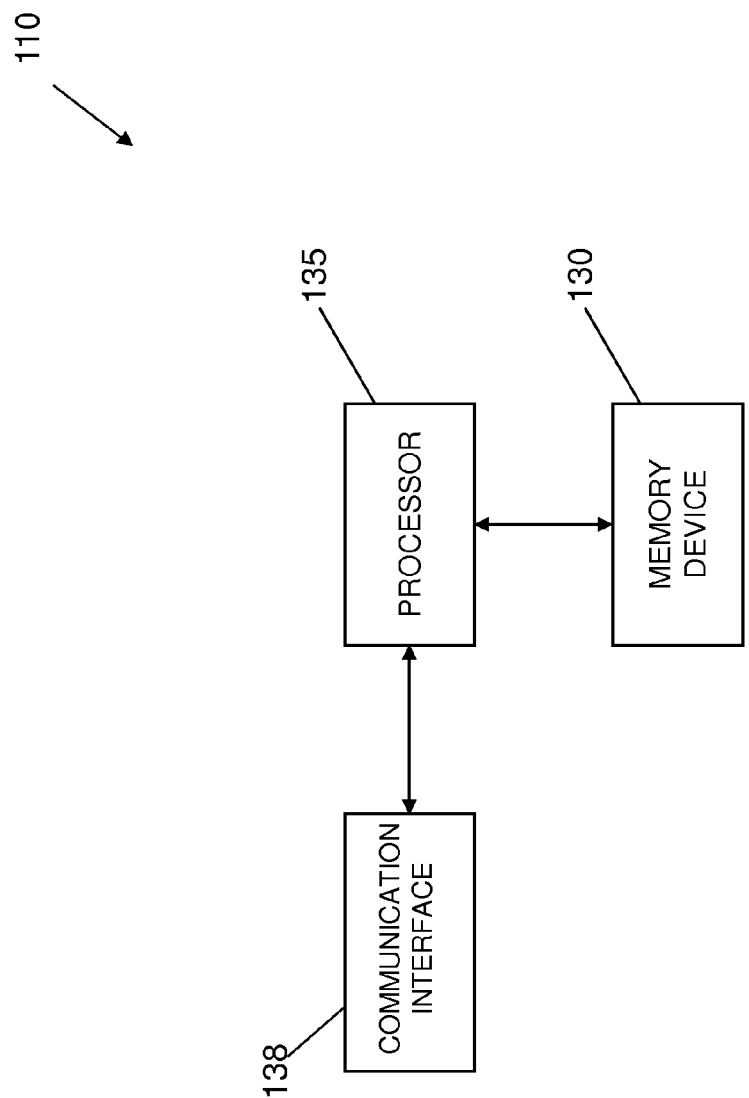
FIG. 4 illustrates a schematic block diagram of a server configured to communicate with the first and second devices of FIG. 3 according to an example embodiment of the present invention.

In other embodiments, however, the first and second devices 100, 105 may operate according to rules stored in a memory associated with the server 110, such as the memory 130 of the server 110 shown in FIG. 4. For example, in such cases, the devices 100, 105 themselves may not include a memory configured to store rules, and thus each device may instead be configured to operate by communicating with the server 110 so as to be directed by the applicable rules as provided by the server.

Thus, in some embodiments, the apparatus 50 for copying rules being applied to one device and applying the rules to another device may be embodied by the device itself (e.g., the first device 100 shown in FIG. 3), such as when the device includes a memory 120, whereas in other embodiments the apparatus may be embodied by the server 110 shown in FIG. 3, such as when the device 100 does not include its own memory. In either case, embodiments of the present invention allow for rules that are being applied to one device (e.g., the second device 105 in the examples described herein) to be applied to another device (e.g., the first device 100 in the examples described herein) through a user's interaction with the device (e.g., the first and/or second device) alone. In other words, the user need not interact with the server 110 directly to accomplish the application of the rules to the first device 100, thereby saving the user time and providing the user with a more intuitive way of configuring a device to operate as another device operates, as described in greater detail below.

Accordingly, an apparatus is provided that includes at least one processor and at least one memory (e.g., the memory 76 of FIG. 1, the memory 120 of FIG. 3, or the memory 130 of FIG. 4) including computer program code. The at least one memory and the computer program code may be configured to, with the processor, cause the apparatus to at least detect a rule-copy action that takes place at the first device 100, identify a second device 105 in response to the rule-copy action, where the second device is configured to operate according to at least one rule, and cause the at least one rule to be applied to the first device in response to detection of the rule-copy action, so as to configure the first device to operate according to the at least one rule.

In some embodiments, the at least one memory and the computer program code may be configured to, with the processor, cause the apparatus to cause the at least one rule to be applied to the first device 100 via communication with the second device 105. Such communication may occur, for example, via an ad hoc wireless network between the two devices 100, 105. With reference to FIGS. 2 and 3, and as described above, for example, in some embodiments each of the first and second devices 100, 105 may include a memory 120, a processor 125 (which may, in some cases, be the processor 76 of FIG. 1), and a communication interface 128 (which may in some cases, be the communication interface 76 of FIG. 1). At least one rule may be stored on the memory 120 of the second device 105, and the second device may be configured to operate according to the at least one rule. The user may, in this example, desire to configure first device 100 to operate according to the same rule or rules according to which the second device 105 is operating. Thus, the user may perform a rule-copy action (described below) on the first device 100, and, as a result, the at least one rule stored on the memory of the second device 105 may be copied from the memory of the second device and stored on the memory of the first device via direct communication between the first and second devices, such as using the communication interface 128 of each respective device (as illustrated in FIG. 2 by the arrow 140). For example, upon detection of the rule-copy action, the first device 100 may send a request to the second device 105, via the respective communication interface 128, for a copy of the rule or rules stored on the memory of the second device. The second device 105 may, in turn, create a copy of the rules and transmit the rules to the first device 100, via the respective communication interface 128, which the first device may then store in its memory. As a result, in this example, the first device 100 would then be configured to operate according to the rules copied from the second device 105.

In other embodiments, such as embodiments in which the first and second devices 100, 105 include memories 120 capable of storing rules (as shown in FIG. 3), but where the server 110 (shown in FIG. 4) embodies the apparatus 50, upon detection of the rule-copy action at the first device 100, the first device 100 may send a request to the server 110 for a copy of the rule or rules stored on the memory of the second device (depicted in FIG. 2 via arrow 150). The server 110 may include a processor 135 (which may be the processor 70 of FIG. 1) and a communication interface 138 (which may be the communication interface 74 of FIG. 1). The server 110, upon receiving the request from the first device 100, may communicate with the second device 105 via the communication interface 138 (as depicted in FIG. 4 via arrow 155) to request a copy of the rules, and the second device may respond via the respective communication interface 128 of FIG. 3 by creating a copy of the rules and transmitting the rules to the server. The server 110 may then transmit the at least one rule to the first device 100 (communication arrow 150), which the first device may then store in its memory. Again, the result in this example would be that the first device 100 would be configured to operate according to the rules copied from the second device 105.

In some embodiments, the first and second devices 100, 105 may include memories (such as the memory 120 shown in FIG. 3); however, the at least one rule may be stored on the memory associated with the server 110 (e.g., the memory 130 shown in FIG. 4), and the second device 105 may be configured to operate in accordance with the rules stored in the memory associated with the server. The apparatus 50 may, in such cases, be embodied by the first device 100. The apparatus may, in such cases, be configured such that the at least one memory and the computer program code are configured to, with the processor, cause the apparatus to cause the at least one rule to be applied to the first device 100 via communication with the server 110. In other words, upon detection of the rule-copy action at the first device 100, the first device 100 may send a request (via the communication interface 128) to the server 110 to have the rule or rules according to which the second device is configured to operate be applied to the first device (depicted in FIG. 2 via arrow 150). The server 110, in turn, may identify the rules stored in the server memory 130 with respect to the second device 105 and may simply apply the same rules to the first device 100 (e.g., via the processor 135), such that the first device 100 would be configured to operate according to the rules according to which the second device 105 is configured to operate. Accordingly, the first device 100 would, as a result, be directed to operate in the same manner that the second device 105 is directed to operate and with reference to the rules stored on the memory 130 associated with the server 110.

In other embodiments in which the first and second devices 100, 105 do not include memories, the second device 105 may be operating in accordance with rules stored in a memory 130 associated with the server 110, as described above and shown in FIGS. 2 and 4, and the apparatus 50 (FIG. 1) may be embodied by the server 110. The apparatus may, in such cases, be configured such that the at least one memory and the computer program code are configured to, with the processor, cause the apparatus to cause the at least one rule to be applied to the first device 100 via communication with the first device. Accordingly, upon detection of the rule-copy action at the first device 100, the server 110 may identify the rules stored in the memory 130 with respect to the second device 105 and may simply apply the rules to the first device 100 (e.g., via the processor 135), such that the first device 100 would be directed to operate according to the rules according to which the second device 105 is configured to operate in the same manner that the second device is directed to operate and with reference to the rules stored on the memory 130 associated with the server 110. Thus, in this particular scenario, the apparatus (embodied by the server 110) would communicate with the first device 100 to detect the rule-copy action (e.g., by receiving signals from the first device regarding the rule-copy action via the respective communication interfaces 128, 138 along arrows 150 of FIG. 2).

As noted above, the rule-copy action imparted by the user on the first device 100 via interaction with the first device (versus interaction with the server) may take many different forms. In some cases, for example, the user may perform a rule-copy action by holding the first and second devices 100, 105 in his hand and shaking both devices together (e.g., a motion-based rule-copy action). In other cases, the user may stack the first and second devices 100, 105, one on top of the other and then provide an activating input (e.g., by tapping on the top-most device of the stack) to effect a rule-copy action (e.g., a position-based rule-copy action). In still other cases, the user may place the first device 100 within a certain predefined distance of the second device 105 (with or without contact between the two devices), which may serve as the rule-copy input (e.g., a proximity-based rule-copy action).

Accordingly, the at least one memory and the computer program code of the apparatus (embodied by either the first device 100 or the server 110) may be configured to, with the processor, cause the apparatus to detect the rule-copy action by detecting a motion imparted on the first device and on the second device at substantially the same time (e.g., within 1 second of each other). In the case of a motion-based rule-copy action, the first and second devices 100, 105 may, for example, include one or more motion sensors 160 (shown in FIG. 3) configured to detect motion of the respective device, such as a gyroscope and/or an accelerometer, etc. The motion sensor 160 may, thus, be in addition to other sensors of the first and second devices (e.g., the sensors 80 used to measure temperature in the case where the devices are configured for monitoring a temperature). Moreover, the first and second devices 100, 105 may, in some cases, further include a clock or other time keeping mechanism configured to measure temporal aspects of the rule-copy action, such as when the action took place (e.g., when the motion was sensed at the motion sensor 160), the duration of the action (e.g., how long the device was shaken), etc. In other cases, however, the first and second devices 100, 105 may not include a clock; rather, temporal aspects of the rule-copy action may be determined with reference to the server 110, which may include a clock and may be configured to correlate the rule-copy action with the temporal aspects as described in greater detail below.

In the case of a motion-based rule-copy action, for example, motion detected at the motion sensor 160 of the first device 100 and the motion sensor 160 of the second device 105 may be correlated with a time the motion took place (by the device itself or by the server 110) to determine whether the two motion inputs occurred at the same time (e.g., within a predetermined window from each other so as to be interpreted as taking place at the same time). In the event that the motions detected at the first and second devices 100, 105 are deemed to have taken place at the same time, the motion may be considered a rule-copy action. In response, as noted above, the second device 105 may be identified, and the at least one rule being applied to the second device may be applied to the first device.

In other embodiments, the at least one memory and the computer program code are configured to, with the processor, cause the apparatus to detect the rule-copy action by detecting a proximity of the first device 100 to the second device 105. For example, each device 100, 105 may be equipped with global positioning functionality (GPS), such that a location of one device with respect to the other may be determined. The approximate physical co-location of the devices 100, 105 (e.g., being located within a certain distance apart, such as within 15 centimeters) may, thus, be considered a rule-copy action in some cases. Physical co-location may be determined by one or both devices 100, 105, such as via communication between the devices in which one or both devices requests and receives information from the other device as to that devices location. In some cases, one or both devices 100, 105 may include other types of proximity detectors 170 (instead of or in addition to, for example, GPS functionality), such as infrared or other sensors that are configured to detect the proximity of the other devices within a certain distance.

In other cases, the server 110 may determine whether the devices 100, 105 are co-located, such as by determining whether messages sent and/or received by the devices were intercepted via the same wireless base station or nearby wireless base stations. In another example, such as when the first and second devices 100, 105 are environment sensors, the server 110 may analyze the sensor values measured by each device to determine whether the reported values are similar enough to each other (e.g., within a predetermined tolerance, such as 5%) so as to indicate co-location. The determination that the devices 100, 105 are co-located may thus serve as the rule-copy action. In response, as described above, the second device 105 may be identified, and the at least one rule being applied to the second device may be applied to the first device 100.

Figure 5B:
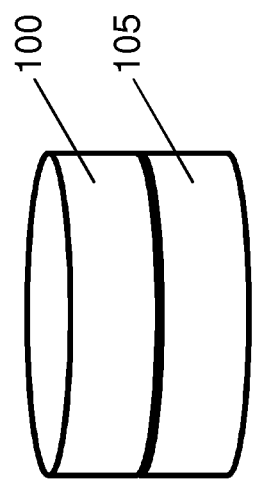
FIG. 5B illustrates a perspective view of the first and second devices of FIG. 5A positioned with respect to each other in a rule-copy action according to an example embodiment of the present invention.
Figure 5A:
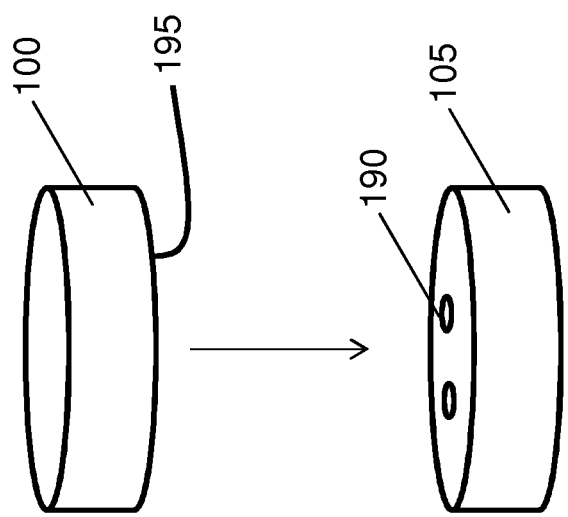
FIG. 5A illustrates a perspective view of first and second devices prior to positioning of the devices with respect to each other to accomplish a rule-copy action according to an example embodiment of the present invention.

In still other embodiments, the at least one memory and the computer program code are configured to, with the processor, cause the apparatus to detect the rule-copy action by detecting a position of the first device 100 with respect to the second device 105. For example, each device 100, 105 may include position detector 180 configured to detect the relative position of one device to the other. The position detector 180 may include, for example, magnetic sensors. With reference to FIGS. 5A and 5B, in some cases the position detector 180 of FIG. 3 may include bumps 190 that protrude from a surface of one device 105 and are configured to activate a capacitive surface 195 on the other device 100, such as via contact when the two devices (FIG. 5A) are brought together (FIG. 5B). In this regard, the position detector 180 may be configured to detect a position of the first device 100 with respect to the second device 105 when the first device is placed on top of the second device or vice versa (e.g., in a stacked arrangement). Although the bumps 190 are depicted in FIG. 5A as being located on an upper surface of the second device 105, the bumps 190 may be on a bottom surface or peripheral surface of the second device. Moreover, the bumps 190 may, in some cases, be located on a surface of the first device 100, and the capacitive surface 195 may be located on the second device 105, or both devices may have bumps and a capacitive surface, such that each device is configured to detect the relative position of another device. In still other embodiments, the user may be required to provide an additional input, once the devices 100, 105 are stacked, to complete the rule-copy action, such as a "tap" or other contact input on a surface of one of the devices (which may be sensed, for example, via another capacitive surface, a motion sensor, etc.).

False positives (e.g., the erroneous detection of a rule-copy action when no rule-copy action was intended by the user) may be minimized or eliminated using different techniques. In some cases, regardless of whether motion-based, proximity-based, or position based rule-copy actions are used, a rule-copy action may only be deemed to have occurred when the participating devices (e.g., the first and second devices 100, 105) are co-located. The physical co-location of the devices 100, 105 may be determined as described above, such as by whether messages from both devices were received and/or transmitted using the same or very nearby wireless base stations, or whether the sensor values for environment conditions (e.g., humidity, temperature) measured using both devices report similar values.

Regardless of how the rule-copy action is detected or by which entity (the first device 100, the second device 105, and/or the server 110), once a rule-copy action is detected at the first device, the second device should be identified in response. In some embodiments, the at least one memory and the computer program code may be configured to, with the processor, cause the apparatus to identify the second device 105 based on participation of the second device in the rule-copy action. For example, detection of a motion-based rule-copy action may be determined to have taken place between the first device 100 and the second device 105 based on the timing of the motion and/or colocation of the devices. Accordingly, because the second device 105 was involved in the rule-copy motion, the second device 105 would be determined to be the device whose rules are to be applied by the first device. Similarly, if the first device 100 comes within the proximity threshold of the second device 105 in the case of a proximity-based rule-copy action, or the first device 100 is stacked on top of the second device 105 in a position-based rule-copy action, then the second device 105 would be deemed a participant in the rule copy action and, thus identified as such so that the rules applied to the second device 105 would be applied to the first device 100.

Figure 6:
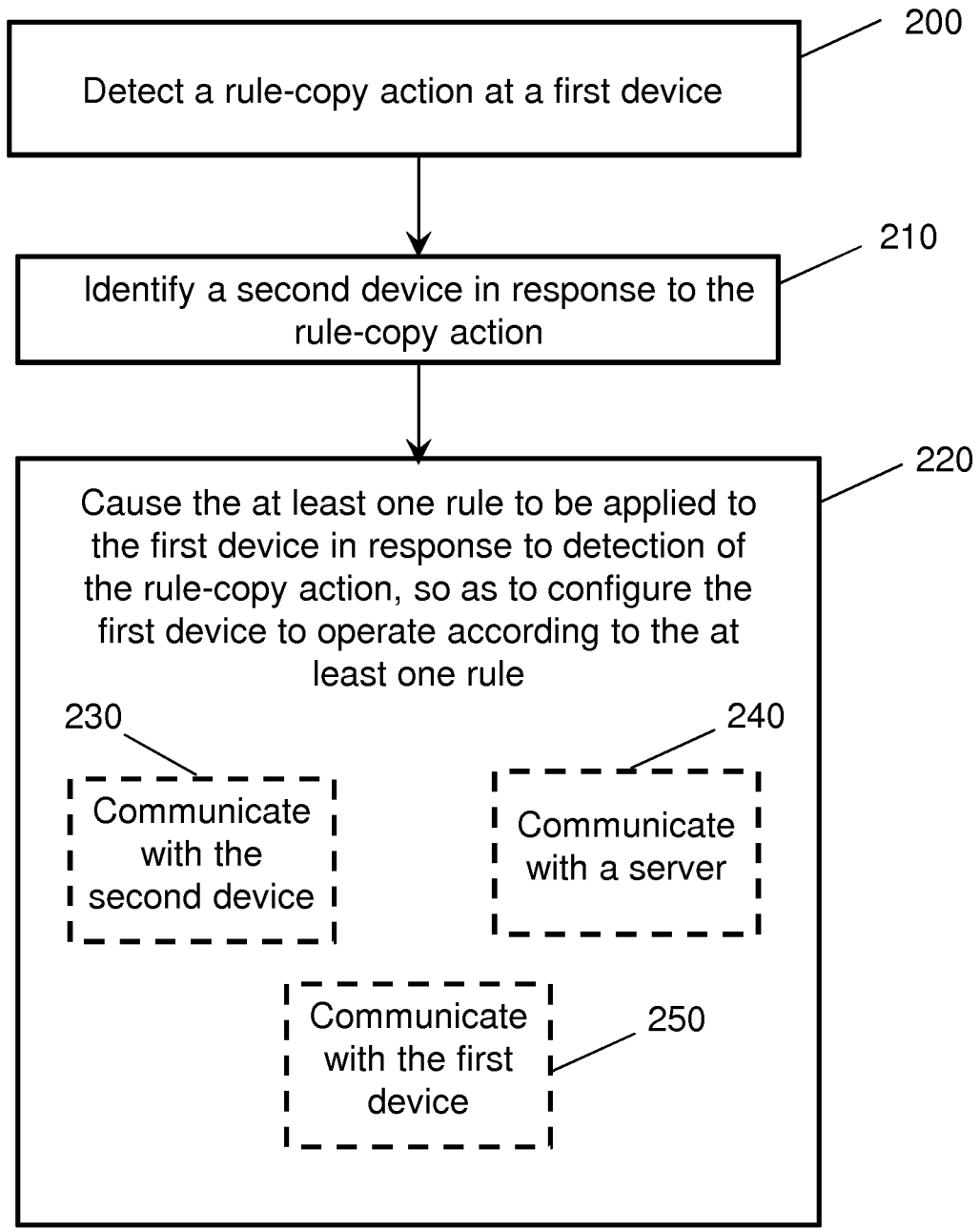
FIG. 6 illustrates a flowchart of methods of providing for rules applicable to one device to be applied to another device according to example embodiments of the present invention.

FIG. 6 illustrates a flowchart of systems, methods, and computer program products according to example embodiments of the invention. It will be understood that each block of the flowchart, and combinations of blocks in the flowchart, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory device of an apparatus employing an example embodiment of the present invention and executed by a processor in the apparatus. As will be appreciated, any such computer program instructions may be loaded onto a computer or other programmable apparatus (e.g., hardware) to produce a machine, such that the resulting computer or other programmable apparatus implements the functions specified in the flowchart block(s). These computer program instructions may also be stored in a computer-readable memory that may direct a computer or other programmable apparatus to function in a particular manner, such that the instructions stored in the computer-readable memory produce an article of manufacture the execution of which implements the function specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart block(s).

Accordingly, blocks of the flowchart support combinations of means for performing the specified functions, combinations of operations for performing the specified functions, and program instruction means for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In this regard, one example embodiment of a method for providing for rules applicable to a second device to also be applied to a first device is shown in FIG. 6. FIG. 6 depicts an example embodiment of a method for applying rules to a first device that includes detecting a rule-copy action at a first device at block 200; identifying a second device in response to the rule-copy action, where the second device is configured to operate according to at least one rule, at block 210; and causing the at least one rule to be applied to the first device in response to detection of the rule-copy action, so as to configure the first device to operate according to the at least one rule at block 220. Detecting the rule-copy action may, as described above, comprise detecting a motion imparted on the first device and on the second device at substantially the same time. Additionally or alternatively, detecting the rule-copy action may comprise detecting a proximity of the first device to the second device and/or detecting a position of the first device with respect to the second device. Moreover, in some embodiments, the second device may be identified based on participation in the rule-copy action.

Depending on how the apparatus is embodied (e.g., by the first device or by a server) and where the rule(s) are stored (on the first and second devices and/or on the server), in some embodiments, causing the at least one rule to be applied to the first device may comprise communicating with the second device at block 230. In other embodiments, causing the at least one rule to be applied to the first device may comprise communicating with a server at block 240, whereas in still other embodiments causing the at least one rule to be applied to the first device may comprise communicating with the first device at block 250.

In some embodiments, certain ones of the operations above may be modified or further amplified as described below. Furthermore, in some embodiments, additional optional operations may be included, some examples of which are shown in dashed lines in FIG. 6. Modifications, additions, or amplifications to the operations above may be performed in any order and in any combination.

In an example embodiment, an apparatus for performing the method of FIG. 6 above may comprise a processor (e.g., the processor 70 of FIG. 1) configured to perform some or each of the operations (200-250) described above. The processor may, for example, be configured to perform the operations (200-250) by performing hardware implemented logical functions, executing stored instructions, or executing algorithms for performing each of the operations. Alternatively, the apparatus may comprise means for performing each of the operations described above. In this regard, according to an example embodiment, examples of means for performing at least portions of operations 200, 210, and 230-250 may comprise, for example, the processor 70, the communication interface 74, and/or a device or circuit for executing instructions or executing an algorithm for processing information as described above. Examples of means for performing operation 220 may comprise, for example, the processor 70, the communication interface 74, the memory device 76, and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus comprising at least one processor and at least one memory including computer program code, the at least one memory and the computer program code configured to, with the processor, cause the apparatus to at least:

store a first set of rules according to which a first device is configured to operate in the at least one memory;

store a second set of rules according to which a second device is configured to operate in the at least one memory;

receive a signal from the first device;

determine whether the signal comprises a request to apply the second set of rules to the first device; and in an instance in which the signal comprises the request, apply the second set of rules to the first device, such that the first device becomes configured to operate according to the second set of rules, wherein each of the first set of rules and the second set of rules comprises a set of instructions directing each respective device to measure a particular variable and to transmit a signal when a particular condition is met.

2. The apparatus of claim 1, wherein the signal received from the first device comprises an indication of a rule-copy action occurring at the first device.

3. The apparatus of claim 2, wherein the rule-copy action comprises detection of a motion imparted on the first device and on the second device at substantially the same time.

4. The apparatus of claim 2, wherein the rule-copy action comprises detection of a proximity of the first device to the second device.

5. The apparatus of claim 2, wherein the rule-copy action comprises detection of a position of the first device with respect to the second device.

6. The apparatus of claim 1, wherein the at least one memory and the computer program code are configured to, with the processor, cause the apparatus to apply the second set of rules to the first device by replacing the first set of rules with the second set of rules.

7. The apparatus of claim 1, wherein the apparatus is embodied by a server.

8. A method comprising:

storing a first set of rules according to which a first device is configured to operate in a memory;

storing a second set of rules according to which a second device is configured to operate in the memory;

receiving a signal from the first device;

determining, via a processor, whether the signal comprises a request to apply the second set of rules to the first device; and in an instance in which the signal comprises the request, applying the second set of rules to the first device, such that the first device becomes configured to operate according to the second set of rules, wherein each of the first set of rules and the second set of rules comprises a set of instructions directing each respective device to measure a particular variable and to transmit a signal when a particular condition is met.

9. The method of claim 8, wherein the signal received from the first device comprises an indication of a rule-copy action occurring at the first device.

10. The method of claim 9, wherein the rule-copy action comprises detection of a motion imparted on the first device and on the second device at substantially the same time.

11. The method of claim 9, wherein the rule-copy action comprises detection of a proximity of the first device to the second device or a position of the first device with respect to the second device.

12. The method of claim 8, wherein applying the second set of rules to the first device comprises replacing the first set of rules with the second set of rules.

13. The method of claim 8, wherein the processor is embodied by a server.

14. A computer program product comprising at least one non-transitory computer-readable storage medium having computer-executable program code portions stored therein, the computer-executable program code portions comprising program code instructions for:
   storing a first set of rules according to which a first device is configured to operate in a memory;
   storing a second set of rules according to which a second device is configured to operate in the memory;
   receiving a signal from the first device;
   determining whether the signal comprises a request to apply the second set of rules to the first device; and
   in an instance in which the signal comprises the request, applying the second set of rules to the first device, such that the first device becomes configured to operate according to the second set of rules,
   wherein each of the first set of rules and the second set of rules comprises a set of instructions directing each respective device to measure a particular variable and to transmit a signal when a particular condition is met.

15. The computer program product of claim 14, wherein the signal received from the first device comprises an indication of a rule-copy action occurring at the first device.

16. The computer program product of claim 15, wherein the rule-copy action comprises detection of a motion imparted on the first device and on the second device at substantially the same time.

17. The computer program product of claim 15, wherein the rule-copy action comprises detection of a proximity of the first device to the second device.

18. The computer program product of claim 15, wherein the rule-copy action comprises detection of a position of the first device with respect to the second device.

19. The computer program product of claim 14, wherein applying the second set of rules to the first device comprises replacing the first set of rules with the second set of rules.

20. The computer program product of claim 14, wherein the computer program product is embodied by a server.

* * * * *